(12) United States Patent
Göktekin

(10) Patent No.: US 10,078,376 B2
(45) Date of Patent: Sep. 18, 2018

(54) MULTIMODEL TEXT INPUT BY A KEYBOARD/CAMERA TEXT INPUT MODULE REPLACING A CONVENTIONAL KEYBOARD TEXT INPUT MODULE ON A MOBILE DEVICE

(71) Applicant: Cüneyt Göktekin, Potsdam (DE)

(72) Inventor: Cüneyt Göktekin, Potsdam (DE)

( * ) Notice: Subject to any disclaimer, the term of this patent is extended or adjusted under 35 U.S.C. 154(b) by 0 days.

(21) Appl. No.: 15/636,189

(22) Filed: Jun. 28, 2017

(65) Prior Publication Data

US 2017/0300128 A1      Oct. 19, 2017

Related U.S. Application Data

(63) Continuation of application No. 14/328,309, filed on Jul. 10, 2014, now abandoned, which is a (Continued)

(30) Foreign Application Priority Data

Mar. 6, 2012   (EP) ..................................... 12158195

(51) Int. Cl.
*G06F 3/02* (2006.01)
*G09G 5/00* (2006.01)
(Continued)

(52) U.S. Cl.
CPC .......... *G06F 3/0237* (2013.01); *G06F 1/1686* (2013.01); *G06F 3/005* (2013.01);
(Continued)

(58) Field of Classification Search
None
See application file for complete search history.

(56) References Cited

U.S. PATENT DOCUMENTS

| 5,384,863 A | 1/1995 | Huttenlocher et al. |
| 5,387,863 A | 1/1995 | Huttenlocker et al. |

(Continued)

FOREIGN PATENT DOCUMENTS

| EP | 2 383 970 A1 | 11/2011 |
| EP | 2 410 465 A1 | 1/2012 |

(Continued)

OTHER PUBLICATIONS

Deaver, "CCD and CIS Scanning Technologies: The Top Five Issues to Consider Before Purchasing a Wide Format Scanner," Syntactix Communications, pp. 1-12 (2006).

(Continued)

*Primary Examiner* — Stephen T Reed
(74) *Attorney, Agent, or Firm* — Mark M. Friedman

(57) ABSTRACT

Methods and modules for a multimodal text input in a mobile device are provided. Text may be input via keyboard or camera mode by holding the camera over written text. An image is taken of the written text, text is recognized, and output to an application by: activating a keyboard mode; providing an A-Z-keyboard in a first input field; activating the camera mode; capturing the text image and displaying the captured image in a second field of a device display; converting the captured image to character text by OCR and displaying the recognized character text on the display; outputting a selected character as the input text to the application upon a character selection, or outputting a selected part of the recognized character text as the input text to the application upon a selection of the part of the recognized character text via by a single keypress, control command, or gesture.

14 Claims, 4 Drawing Sheets

Related U.S. Application Data continuation of application No. 13/786,321, filed on Mar. 5, 2013, now Pat. No. 9,811,171.

(51) Int. Cl.
| | |
|---|---|
| *G06F 3/023* | (2006.01) |
| *G06F 1/16* | (2006.01) |
| *G06F 3/00* | (2006.01) |
| *G06K 9/32* | (2006.01) |
| *G06F 17/28* | (2006.01) |
| *G06F 3/0488* | (2013.01) |
| *G06F 3/01* | (2006.01) |
| *G06F 17/27* | (2006.01) |
| *G06K 9/18* | (2006.01) |

(52) U.S. Cl.
CPC ............ *G06F 3/013* (2013.01); *G06F 3/0227* (2013.01); *G06F 3/04883* (2013.01); *G06F 3/04886* (2013.01); *G06F 17/276* (2013.01); *G06F 17/289* (2013.01); *G06K 9/18* (2013.01); *G06K 9/3258* (2013.01); *G06F 3/02* (2013.01); *G06F 2203/0381* (2013.01); *G06K 2209/01* (2013.01); *G09G 5/00* (2013.01)

(56) References Cited

U.S. PATENT DOCUMENTS

| | | | |
|---|---|---|---|
| 5,491,760 A | 2/1996 | Withgott et al. | |
| 5,511,148 A | 4/1996 | Wellner | |
| 5,642,518 A | 6/1997 | Kiyama et al. | |
| 5,649,222 A | 7/1997 | Mogilevsky | |
| 7,069,506 B2 | 6/2006 | Rosenholtz et al. | |
| 7,330,608 B2 | 2/2008 | Berkner et al. | |
| 7,450,960 B2 | 11/2008 | Chen | |
| 7,787,693 B2 | 8/2010 | Siegemund | |
| 8,086,275 B2 | 12/2011 | Wykes et al. | |
| 8,098,934 B2 | 1/2012 | Vincent et al. | |
| 8,208,737 B1 | 6/2012 | Ie | |
| 8,713,433 B1 | 4/2014 | Ouyang et al. | |
| 8,988,543 B2 | 3/2015 | Göktekin et al. | |
| 9,589,198 B2 | 3/2017 | Göktekin et al. | |
| 2003/0169924 A1 | 9/2003 | Nishiyama et al. | |
| 2004/0189804 A1 | 9/2004 | Borden, IV et al. | |
| 2005/0052558 A1* | 3/2005 | Yamazaki ............... G06K 9/228 348/333.12 |
| 2005/0169527 A1 | 8/2005 | Longe et al. | |
| 2005/0205671 A1 | 9/2005 | Gelsomini et al. | |
| 2006/0017752 A1 | 1/2006 | Kurzweil et al. | |
| 2006/0098874 A1 | 5/2006 | Lev | |
| 2007/0047813 A1 | 3/2007 | Simske et al. | |
| 2007/0106468 A1 | 5/2007 | Eichenbaum et al. | |
| 2008/0118162 A1 | 5/2008 | Siegemund | |
| 2008/0207254 A1 | 8/2008 | Pierce et al. | |
| 2009/0177653 A1 | 7/2009 | Hirabayashi | |
| 2009/0227283 A1 | 9/2009 | Pylvanainen | |
| 2010/0005083 A1 | 1/2010 | Morgana et al. | |
| 2010/0123676 A1 | 5/2010 | Kirkup | |
| 2010/0128994 A1 | 5/2010 | Zwolinski | |
| 2010/0131900 A1 | 5/2010 | Spetalnick | |
| 2010/0172590 A1 | 7/2010 | Foehr et al. | |
| 2010/0289757 A1 | 11/2010 | Budelli | |
| 2010/0293460 A1 | 11/2010 | Budelli | |
| 2011/0081948 A1 | 4/2011 | Shirai et al. | |
| 2011/0202836 A1* | 8/2011 | Badger ................ G06F 3/0237 715/702 |
| 2011/0280641 A1 | 8/2011 | Jiang | |
| 2011/0249900 A1 | 10/2011 | Thorn et al. | |
| 2011/0267490 A1 | 11/2011 | Göktekin et al. | |
| 2012/0131520 A1 | 5/2012 | Tang et al. | |
| 2012/0134590 A1 | 5/2012 | Petrou et al. | |
| 2012/0296646 A1* | 11/2012 | Varthakavi ............... G10L 15/26 704/235 |
| 2013/0113943 A1 | 5/2013 | Wormald et al. | |
| 2013/0234945 A1 | 9/2013 | Göktekin | |
| 2013/0234949 A1 | 9/2013 | Chornenky | |
| 2014/0320413 A1 | 10/2014 | Göktekin | |
| 2014/0379946 A1 | 12/2014 | Zhang et al. | |
| 2015/0278621 A1 | 10/2015 | Göktekin et al. | |

FOREIGN PATENT DOCUMENTS

| | | |
|---|---|---|
| EP | 2 189 926 B1 | 9/2012 |
| EP | 2 637 128 A1 | 9/2013 |
| WO | WO 02/25575 A3 | 3/2002 |
| WO | WO 2005/101193 A2 | 10/2005 |
| WO | WO 2006/002706 A1 | 1/2006 |
| WO | WO 2007/082536 A1 | 7/2007 |
| WO | WO 2008/063822 A1 | 5/2008 |

OTHER PUBLICATIONS

Final Office Action dated Apr. 9, 2015, in U.S. Appl. No. 13/786,321 (17 pages).
Ho, "CapnTrans Demo," Retrieved from the Internet: http://www.youtube.com/watch?v=QRZe3qV9gBO, Retrieved on Jun. 18, 2012, CP007920719, whole document.
Iketani et al., "Video Mosaicing Based on Structure from Motion for Distortion-Free Document Digitization," Computer Vision ACCV, Part II, LNCS 4844, pp. 73-84 (2007).
"iPhone User Guide—for iPhone OS 3.1 Software," Apple, Inc., Dec. 31, 2009, pp. 31-36.
Nakajima et al., "Video Mosaicing for Document Imaging," *Proc. CBDAR, Demo Session*, pp. 171-178 (2007).
Non-Final Office Action dated Nov. 20, 2014, in U.S. Appl. No. 13/786,321 (16 pages).
Wempen, "Unlock the secrets of scanner technology," retrieved on Jun. 19, 2015, from www.techrepublic.com/article/unlock-the-secrets-of-scanner-technology.

\* cited by examiner

MULTIMODEL TEXT INPUT BY A KEYBOARD/CAMERA TEXT INPUT MODULE REPLACING A CONVENTIONAL KEYBOARD TEXT INPUT MODULE ON A MOBILE DEVICE

RELATED APPLICATIONS

This application is a continuation of U.S. application Ser. No. 14/328,309, filed Jul. 10, 2014, which is a continuation of U.S. application Ser. No. 13/786,321, filed Mar. 5, 2013, now pending, which claims priority under 35 U.S.C. § 119 and 365 to European Application No. 12158195.3, filed Mar. 6, 2012, the entire teachings of which are incorporated herein by reference.

BACKGROUND

The present invention relates to a method and a module for multimodal text input on a mobile device either via a keyboard or in a camera based mode by holding the camera of the mobile device on a written text, such that an image is captured of the written text and the written text is recognized, wherein an input text or the recognized text, respectively, is output as the input text to an application receiving the input text.

Mobile devices such as mobile phones or smart phones with an integrated camera module and with a display such as a touch screen display, for instance, show a good market penetration and a use in daily life far beyond a simple phone application. The mobile device is used as well as a pocket book, a memo book, a calendar with planner, an address book, for receiving and writing SMS and emails and so on.

A standard mobile device offers already the integrated camera module with a resolution over 5 Megapixels sometimes even with optical zoom and it has a powerful microprocessor with over 300 MIPS (mega instructions per second). However, the text input on the mobile device for standard software applications seems sometimes cumbersome on a small keyboard or on the touch screen keyboard.

EP 2333695A1 discloses a camera based method for alignment detection of the mobile device to the written text on a sheet of paper or on a display, by analyzing the captured image of the written text. Immediate feedback by optical and acoustical feedback helps the user to align the mobile device faster and better with the written text, resulting in a faster and better optical character recognition (OCR) for the text input into the mobile device.

EP 10161624 discloses another camera based method for the text input and for a keyword detection, wherein the written text gets captured by the image, converted via OCR and analyzed for finding a most probable keyword therein. Such a kind of an input of the written text into the mobile device facilitates the text input for text translation applications and for internet searches about the written text in a book, for instance.

EP 08 169 713 discloses a method and a portable device such as preferably a mobile communication device for providing camera based services including the internet, capturing an image of a text page and processing the image data such that text is recognized via OCR software for a further usage within an application.

However said methods are supportive for the text input into some special applications without a need to input the text tediously character by character via the keyboard, the application needs to be adapted to the program module with one of the disclosed methods, thus the use of said methods is limited to a rather small field of applications.

Current Translator devices, such as for instance "Sprachcomputer Franklin" from Pons, "Dialogue" or "Professional Translator XT" from Hexaglot or "Pacifica" from Lingo Corporation, for example all use the keyboard input for words or sentences which shall be translated. However to input the word or the sentence in another language on the keyboard is often difficult or even nearly impossible if unknown characters as Chinese or Greek characters should be input.

An interesting approach to a multimodal input for text is disclosed in US 20110202836A1, wherein text can be input in an application of the mobile device via a keyboard or via speech, wherein the speech is recognized and converted to the input text. However, sometimes a foreign word may be difficult to spell correctly and the speech recognition has also its limitations. So, the captured image of written text with a following OCR might be seen as advantageous in many cases.

SUMMARY

All together, for the input of text in the mobile device the keyboard will be probably always kept as a first option, however multimodal additional input possibilities are advantageous in many cases and could be incorporated, as far as possible. Thus, the multimodal text input via the keyboard and via the camera with OCR implemented in a text input program module would be greatly desirable. It would allow the same keyboard input functionality as before with a standard keyboard input module but also the additional camera based text input possibility. It would be also desirable if the multimodal text input program module could replace the standard keyboard module on the standard mobile devices, such as for instance on mobile phones, smart phones or the like, and under respective operating systems.

The objective of the invention is to overcome the shortcomings explained above and to provide a method for a multimodal text input in a mobile device via a keyboard or in a camera mode by holding the camera of the mobile device on a written text, wherein the written text is recognized and selectable, such that a respective key character or a part of the recognized text is selectable by a single keypress or command for an immediate output to an application requesting the text input.

Another objective of the invention is a program module executing said method to either replace or complement an original standard keyboard text input module, such that a multimodal text input via the conventional keyboard and via the camera mode is made possible.

The above objectives as well as further objectives which will also become apparent from the following description are achieved by a method and a module for a multimodal text input in a mobile device either by a keyboard or in a camera mode by recognizing text within a captured image of a written text according to the features mentioned in the independent claims 1, 2 and 12, respectively. Additional features and characteristics of the invention are mentioned in the dependent claims.

Said method allows the multimodal text input in the mobile device via a conventional keyboard or in a touch screen keyboard as well as in a camera mode, wherein the camera of the mobile device has to be simply held over a written text, such that an image is taken of the written text and the written text is recognized and output to an application as it would have been input via the keyboard. Especially in a case of a text input in a foreign language such a text input possibility is very advantageous, for instance, in case of a translation application for traveling, wherein the input has to be done in Chinese, Greek or Latin language.

Advantageously the graphical user interface (GUI) changes between a keyboard and the camera text input mode, such that always relevant keys and/or fields for displaying either the keyboard or the written text in a part of the captured image or of selectable words get displayed. Touch sensitive keys or fields within a first field of the keyboard or a second field of the part of the captured image or a third field of recognized words are adapted to be ergonomical. Also gestures can be read as control commands even increasing the effective virtual communication field between the text input interface and the user.

Another advantageous embodiment of the multimodal text input module has always the same size of a graphical user interface (GUI) on a display of the mobile device, the same size as an original standard keyboard module making an exchange of the module easier. Also, the interface to the application activating normally the standard keyboard module is kept the same, such that any application before communicating with the standard keyboard interface is now capable of communicating as well with the multimodal text input module. Advantageously the multimodal method or the module with its implementation can replace the original standard keyboard module, having still the same functionality plus the additional camera mode text input.

In another embodiment the already existing original keyboard module is still kept and used on the mobile device as it is, but wherein an additional multimodal text input module steadily running in the background checks whether the original keyboard module is activated by an application. In case the original keyboard module is activated by the application the multimodal text input module activates the camera mode, opens an additional second and/or third field on the display showing the written text captured by the camera in the second field and the recognized text converted by OCR in the third field. Possibly the converted text is displayed as overlaid text over the original written text in the second window. This preferred method allows the multimodal text input on mobile devices or operating systems, respectively, wherein the keyboard module cannot be replaced.

Other embodiments foresee the optical character recognition on a remote server, wherein the part of the captured image of the written text, which is rather small and can be transferred over the air, gets transferred, wherein the respective recognized text is sent back and received and displayed for a possible selection on the mobile device.

Further advantageous aspects of the invention are set out in the following detailed description.

One solution of a preferred embodiment according to the present invention is disclosed in the following drawings and in the detailed description but it shall not be limiting the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1A:
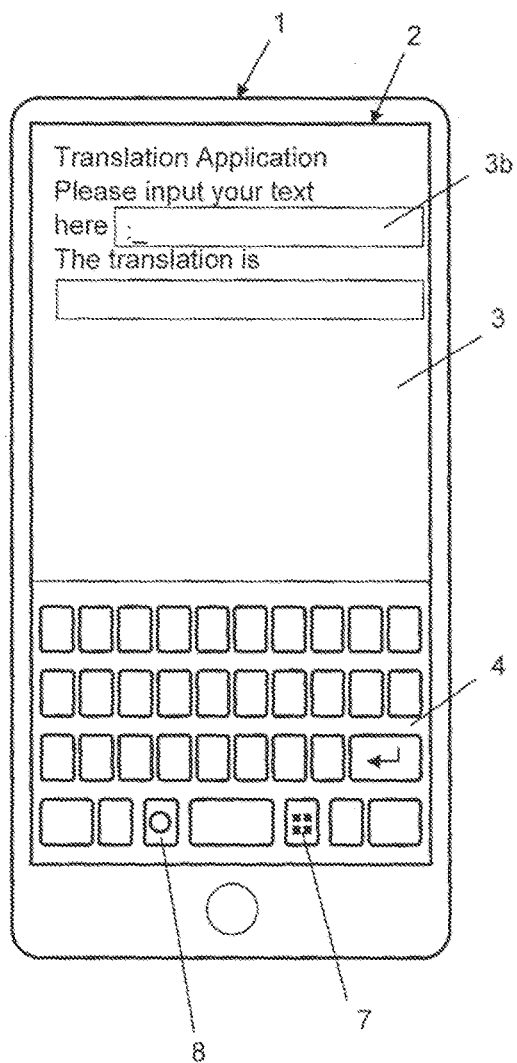
FIG. 1a is a drawing of a mobile device with a display showing a text in an application window, an A-Z-keyboard with a camera mode key in a first field, a captured written text in the second field and a recognized text in a third field.

FIG. 1a shows a preferred embodiment of the present invention being a multimodal text input method and module on a mobile device 1. The multimodal text input method and module allow a user to input a text into an application on the mobile device 1 either via a keyboard or via a camera integrated in the mobile phone, wherein the user holds the mobile phone with the camera over a written text, the mobile phone captures an image of the written text and converts it via optical character recognition (OCR) into character text, such that parts of the recognized text can be selected as input text for the application. In other words, the user may input the text conventionally via the keyboard in what is called a keyboard mode or he may input the text via the camera in what is called a camera mode if a written text in front of him is available.

Preferably the multimodal text input method is implemented in a multimodal text input program module, or further simply called "module", with the same interface to an application as an original keyboard module and under a respective operating system of the mobile device 1. If so, then said module can replace the original keyboard module on the mobile device 1, advantageously offering all applications multimodal text input features as described above. Thus the user can choose whether he wants to input the text conventionally via the keyboard or in the camera mode selecting the recognized text or a part thereof.

An alternative solution instead of replacing the original keyboard module by the complete integral multimodal text input program module is a provision of a separate camera text input module, wherein the camera text input module is like a complement or supplement to the original keyboard module and always active in the background to detect whether the original keyboard module is activated by the application. In case the keyboard module is detected as activated, the camera text input module activates the camera mode and preferably displays an additional field on the display 2 displaying the captured written text and preferably the recognized text which can be selected by a keypress, a gesture 9, by a voice command or the like. Thus the text can be input either via the keyboard or via the camera text input module in the camera mode and the input text will be sent to the application. In case the original keyboard module gets closed, by the application, a key, a timer or the like, the keyboard module is not detected anymore by the camera text input module, whereupon the camera text input module will deactivate the camera mode and delete any displayed second field 5 or third field 6 on the display 2.

For clarity, the "application" stands for instance for a translation application, a search application such as Google search or the like searching for a keyword in the internet, a phone application requesting for a phone number or a name or for any other application requesting text input.

The "text" stands preferably for any character text, a single or multiple character/s, a string of connected characters such as a word, a number or the like.

The "character" stands preferably for any character and for any number.

The "written text" stands preferably for any written or displayed text on a sheet of paper, in a book or also on a screen or the like which can be captured by the camera.

The "keyboard text input" is preferably understood as any text input on the keyboard.

The "keyboard" stands preferably for a touch screen keyboard, a mechanical conventional keyboard, a holographic keyboard or the like, wherein characters can be input manually or wherein a typing is registered.

The "A-Z-keyboard" stands preferably for a keyboard comprising a full set of keys from A to Z or from 0 to 1 and at least one control key such as ENTER, for instance.

The "original keyboard module" stands preferably for a standard keyboard module or sub-program, being already available for the respective mobile device 1 with its respective operating system and respective applications, but a new proprietary or separate keyboard module for a certain mobile device 1 is also conceivable.

A "Control key" stands preferably for a respective key on the keyboard executing a certain function or for a hidden touch key behind one of the displayed fields as the first 4, the second 5 and/or the third field 6, for instance.

A "keypress" or a respective "keypress event" stands preferably for a manual pressing of a certain key or hidden key of the keyboard or of the touch screen, for a certain gesture 9 on the touch screen or in front of a camera, and also for a swype gesture 9. A "single keypress" can also be a double click or double press or double touch on the same key or place. A certain signal strength or pattern from an acceleration sensor is preferably also usable as a keypress.

The "mobile device 1" stands preferably for any mobile-phone, smart-phone or the like.

The "display 2" stands preferably for any conventional non-touch-screen display as well as for any touch screen with touch key functionality.

FIG. 1*a* shows a preferred embodiment of an implementation of the multimodal text input method according to the present invention. FIG. 1 shows the mobile device 1 with the display 2 being the touch screen. On the touch screen there is displayed an application window 3 with a graphical user interface (GUI) of the application, the GUI comprising a text input field 3*b* and preferably a text output field below. As the text input field 3*b* has been activated by the application or by the user the application requested the text input and started the text input module being the multimodal text input module. The multimodal text input module starts displaying the conventional keyboard being the A-Z-keyboard in the first field 4. Preferably the first field 4 for the A-Z-keyboard has the same size as an original keyboard module which has been replaced on the mobile device 1 by the multimodal text input module. Thus the user may input text as usual via the displayed touch screen keyboard or he may press a camera mode key 8 to switch over to the camera mode.

Figure 1B:
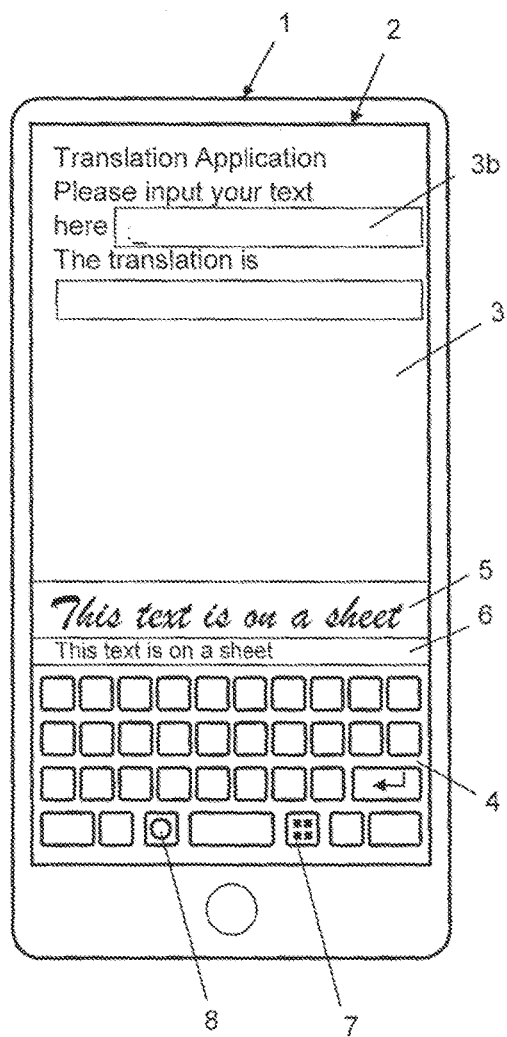
FIG. 1b is a drawing of the mobile device with the display showing the text in the application window and the A-Z-keyboard with the camera mode key in the first field.

FIG. 1*b* shows the same preferred embodiment of the implementation of the multimodal text input method as shown in FIG. 1*a* but after a keypress on the camera mode key 8. In the camera mode the first field 4 for the keyboard is preferably smaller compared to a size in the keyboard mode of FIG. 1*a*, such that the difference between the size of the first field 4 in the keyboard mode and the smaller size in the camera mode is used for displaying the second field 5 wherein a part of the captured written text is displayed and for displaying the third field 5 wherein the recognized text is displayed. In this preferred embodiment the size of any displayed fields in the keyboard mode as well as in the camera mode is always kept the same, such that the used size of the touch screen is kept the same as that of the original keyboard module, such that the original keyboard module can be replaced by the multimodal text input module without overlapping the application more than originally planned by a usage of the original keyboard module.

In the example shown in FIG. 1*b*, the user holds the camera of the mobile device 1 over the written text being "This text is on a sheet", wherein the mobile device 1 captures preferably continuously images and displays a part of the respective image in the second field 5. Parallel to said process of capturing the respective images, the respective image gets analyzed by an optical character recognition (OCR) generating the recognized text and preferably displaying the recognized text in the third field 6. If the recognized and displayed text is correct and desired the user selects the recognized text as input text, whereupon the selected text is output to the application preferably in the same way as the text would have been input via the keyboard.

A selection of the recognized text in the third field can be made preferably by a second keypress on the camera key or a keypress on the third field or on the RETURN key or the like. Other preferred possibilities for the selection of the recognized text are for instance via voice or via a timer, such that if the camera is held for a time longer than a stored time limit over the same written text the selection is executed. Other kinds of selection are not excluded.

Another preferred embodiment of the camera mode includes word recognition within the recognized text, such that words are identified and such that upon a selection only the word in a focus or in the middle of the third field or behind cross hairs, respectively, is selected and output. Another preferred selection can be made by touching or pressing, respectively, on the word on the touch screen.

It is also imaginable that the recognized text gets displayed preferably as an overlaid recognized text over the captured text in the second field 5. In this case the captured text in the second field 5 gets preferably erased, such that the recognized text can be overlaid on the displayed image preferably in a similar size and width as the original text.

This would reduce necessary space, such that the third field 6 is not needed anymore and therefore the first field 4 or the second field 5 can take over that space.

Another preferred method of selecting one of the words of the recognized text displayed adjacent to the displayed keyboard is via a keypress on a key in next proximity of the desired word as input text.

Another preferred method of selecting one of the words of the recognized text is by displaying next to each word a respective identifier such as a certain number, for instance, and by a keypress on that respective number on the keyboard.

Figures 3A, 3B:
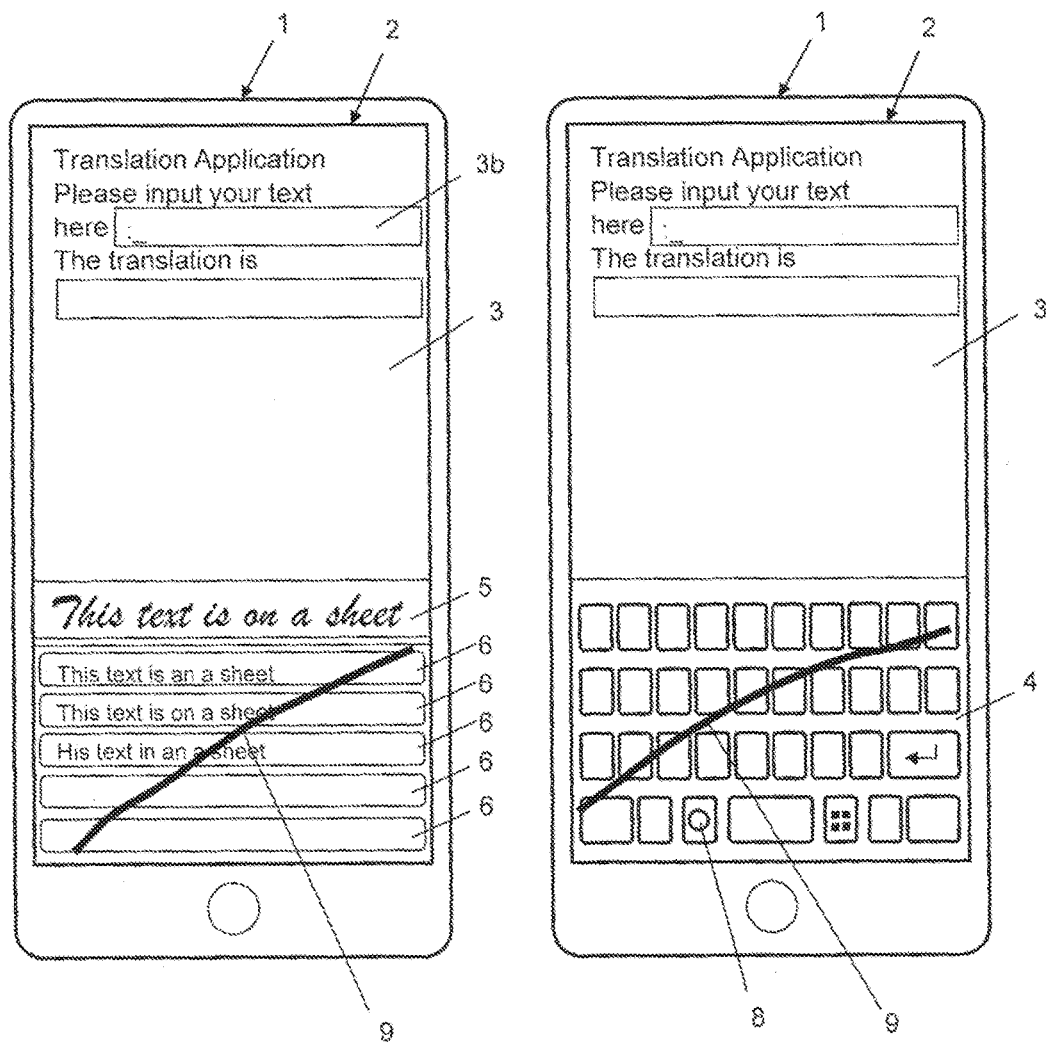
FIG. 3a is a drawing of the mobile device with the display showing the text in the application window, the reduced keyboard, the captured written text in the second field, the recognized text and suggestion candidates in three third fields, wherein the first field is overlapping the second and the third fields wherein a gesture crossing the first field is input.
FIG. 3b is a drawing of the mobile device with the display showing the text in the application window and the A-Z-keyboard, wherein another gesture is input crossing the first field.

Preferably by pressing a KEYBOARD key 7 the mode is switched back from the camera mode to the keyboard mode, wherein the keyboard as shown in FIG. 1*a* is bigger and easier to use than in the camera mode shown in FIG. 1*b*. It should be mentioned that in the camera mode according to the preferred embodiment shown in FIG. 1*b* the text input can also be undertaken via the shown keyboard, the only disadvantage would be that it is smaller. A switching between the keyboard and the camera mode can preferably be done in several different ways, by the keypress on the camera mode key 8 or the keyboard key 7, by a keypress on only the camera mode key 8 for changing the mode, by a gesture 9 as shown in FIG. 3*a* and FIG. 3*b*, and the like.

Figure 2A:
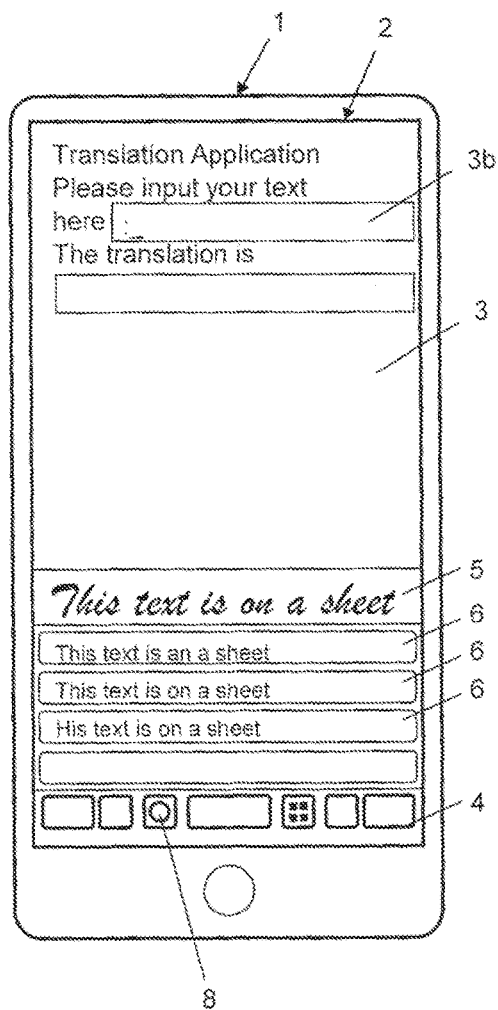
FIG. 2a is a drawing of the mobile device with the display showing the text in the application window, a reduced keyboard with the camera mode key in the first field, the captured written text in the second field and the recognized text and suggestion candidates in three third fields.

FIG. 2*a* shows another preferred embodiment of an implementation of the present invention. On the display 2 being the touch screen there are displayed three third fields 6, wherein preferably the first one displays the recognized text and the second and the third one beneath display suggestion candidates. The one or more suggestion candidates are preferably generated by an algorithm in connection to a database, wherein according the recognized character text, which might not be correctly recognized or spelled wrong, best fitting words with a high probability to be correct are generated as the suggestion candidates. The database is preferably a dictionary or a lookup-table. Thus the user can select whatever fits best as the input text. It is also imaginable that only one or more closest fitting words are generated as suggestion candidates for a recognized word in the recognized text which has not been found in the database. The keyboard in the first field 4 is in the camera mode preferably a reduced keyboard, wherein preferably only some necessary control keys or the bottom line of the A-Z-keyboard are displayed in order to provide more space for the camera mode input GUI being the second field 5 and one or more third fields 6 preferably in an area and of the size of the GUI of the original keyboard module.

A preferred embodiment of the present invention foresees also a sending of the captured image or preferably of the part of the displayed image in the second field 5 as image data to a remote server, where the image data are OCR processed and the recognized text and preferably the suggestion candidates are generated and returned to the mobile device 1. This preferred method of a kind of remote computing is advantageous as it keeps the calculation power and the memory requirement on the mobile device 1 small, especially as regards the database for the OCR and as regards different languages. Also the development effort is reduced drastically with regard to an implementation of image processing and the OCR on different mobile device 1 types and operating systems.

Figure 2B:
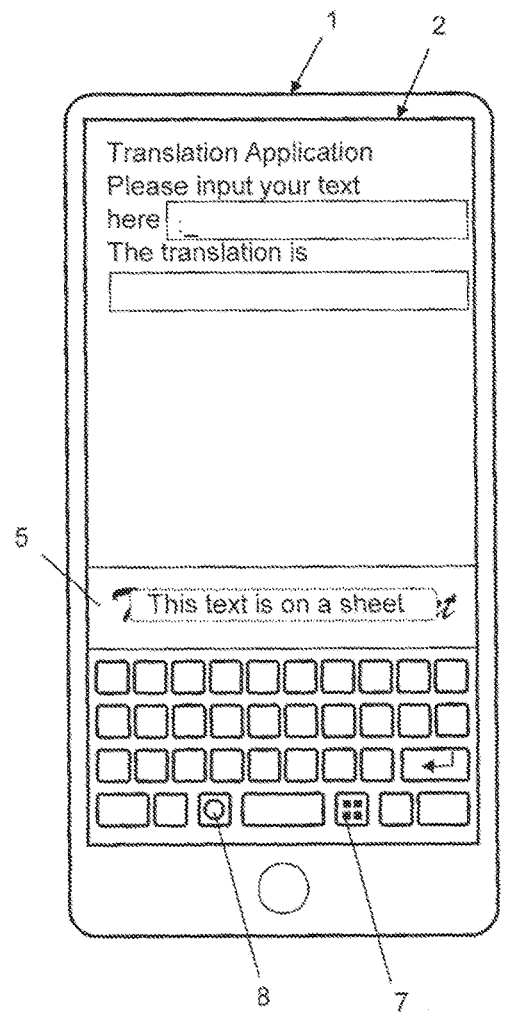
FIG. 2b is a drawing of the mobile device with the display showing the text in the application window, the A-Z-keyboard with the CKK in the first field, the captured written text in the second field.

FIG. 2*b* shows another preferred embodiment of an implementation of the present invention, wherein the recognized text is displayed as the overlay over the text within the captured image in the second field 5. Preferably either the third field 6 with the recognized text is overlaid over the second field 5 with the captured image, or in the displayed part of the captured image the recognized characters are erased and only the recognized text in a similar size and width is overlaid.

FIG. 3*a* shows another preferred embodiment of an implementation of the present invention, wherein the mobile phone 1 is in the camera mode. In this preferred embodiment the GUI of the camera mode occupies a certain display area of the touch screen and none of the keyboard keys of the A-Z-keyboard is visible. The usage within the camera mode is as explained above, wherein a switch over or a change to the keyboard mode is preferably detected by a preferred gesture 9. The switch over to the keyboard mode is also imaginable by a keypress of any other defined gesture 9, of a hidden key, on the captured image in the second field 5, or the like. The full size of the text input GUI can be used in this way for the camera input mode, which is the certain display area. If the switch over to the keyboard mode is detected, preferably the image of FIG. 3*b* occurs on the mobile device 1.

FIG. 3*b* shows the same preferred embodiment of the implementation of the present invention as in FIG. 3*a*. Now the text input module is in the keyboard mode, wherein the A-Z-keyboard is displayed in the first field 4. Preferably the camera key 8 is displayed as well for another switch back to the camera mode as shown in FIG. 3*a*. The switch back from the keyboard mode to the camera mode is also possible by a preferred gesture 9, similar to the one described under the camera mode regarding FIG. 3*a*.

Figure 4:
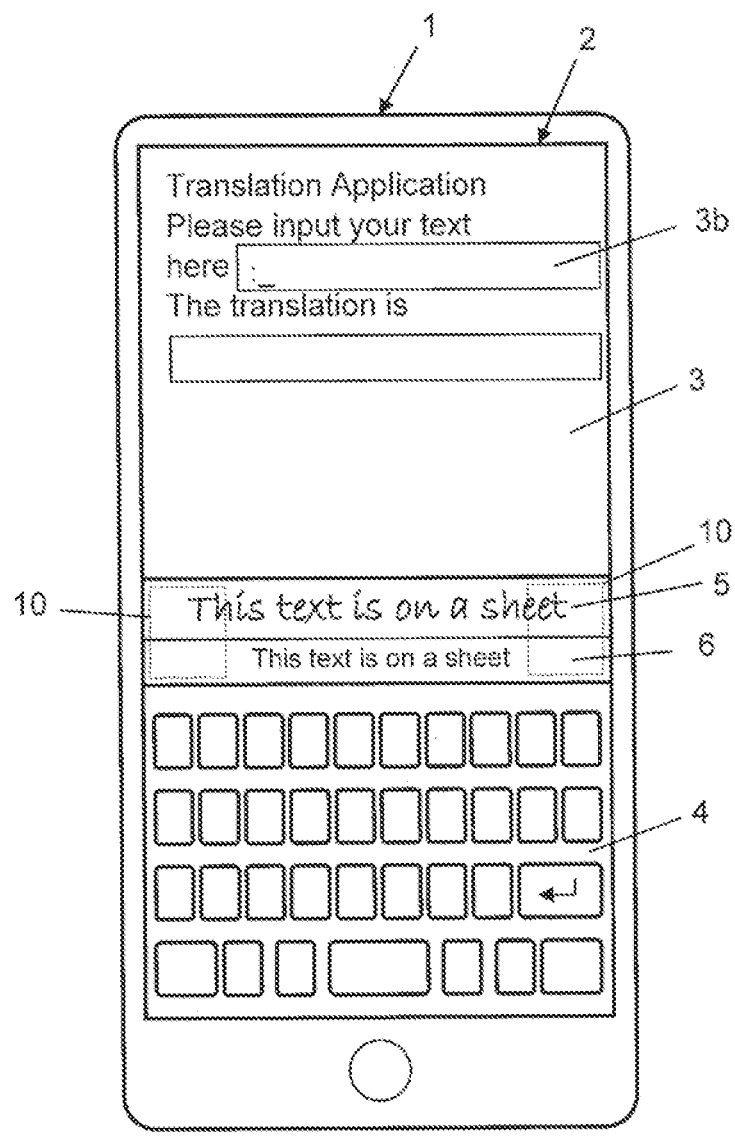
FIG. 4 is a drawing of the mobile device with the display showing the text in the application window, an original A-Z-keyboard in the first field of an original keyboard application and the captured written text in the second field and the recognized text in the third field of a camera input module.

FIG. 4 shows another preferred embodiment of the implementation of the present invention, wherein the original keyboard module is kept on the mobile device 1 and wherein the multimodal keyboard input module is reduced to the camera text input module complementary to the original keyboard module. The preferred camera text input module is preferably adapted to enhance the original keyboard module on the mobile device 1 by the features of the camera mode. As the application requires the text input it starts the original keyboard module which is detected by the camera text input module being always active for detecting in the background. Upon the detection of the activated original keyboard module the camera text input module activates the camera and preferably opens the second field 5 and displays the part of the captured image with the written text.

Preferably the keyboard text input module is independent from the camera text input module, but the camera text input module is dependent of the state of the keyboard text input module, which is checked continuously by the camera text input module.

In the preferred embodiment shown the recognized text is displayed in the third field 6 below the second field 5. It is also imaginable to overlay the recognized text over the captured written text, such that the third field 6 is either overlaid over the second field 5, or such that the letters of the recognized text are overlaid over the captured written text within the part of the captured and displayed image.

FIG. 4 shows also hidden touch keys 10 within the second 5 and the third field 6. Such preferred hidden touch keys can also be seen as a reduced keyboard, wherein the hidden touch keys are displayed to the user by the frame or frame sides of the second 5 and/or the third field 6, for instance, or the like. A keypress on one of the hidden touch keys 10 within the preferred embodiment of FIG. 4 would select the recognized text, for instance.

Preferably the embodiment of FIG. 4 of the implementation of the present invention can also be used for another mobile device 1 with a conventional mechanical keyboard, wherein the second field 5 and/or the third field 6 are displayed and wherein the selection of the part or the whole of the recognized character text or of the suggestion candidate could be performed by the touch screen, by voice, by a rarely used key, by a certain pattern of an acceleration sensor, by an optical signal, or by another control signal. In the case of the conventional mechanical keyboard and if the display 2 is no touch screen, an additional key on the mechanical keyboard for the selection of a recognized text is rather difficult. Thus the selection could be controlled by another key event, such as for instance one generated by a voice command, by detection that a recognized text is in a repetitive sequence is for a longer time than a time limit the same one, by an acceleration sensor pattern or the like, Where technical features mentioned in any claim are followed by reference signs, those reference signs have been included for the sole purpose of increasing intelligibility of the claims and accordingly, such reference signs do not have any limiting effect on the scope of each element identified by way of example by such reference signs.

REFERENCE NUMERALS

1 mobile device
2 display
3 application window
3b text input field
4 first field
5 second field
6 third field
7 keyboard key
8 camera mode key
9 gesture
10 hidden touch key The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for multimodal text input in a mobile device comprising a touch screen display, a touch screen A-Z keyboard and a camera, the method comprising:
    using an original communication interface between a third-party application and an original keyboard module, wherein the original keyboard module is replaced by a multimodal text input module communicating with said third-party application instead of the original keyboard module;
    said third-party application requesting an input text through a text input field;
    executing the multimodal text input module by running the multimodal text input module in the background of the mobile device and constantly monitoring the background of the mobile device to detect when the text input field of the third-party application is activated;
    wherein the multimodal text input module simultaneously activates both a keyboard mode and a camera mode, said keyboard mode configured to:
        display an A-Z keyboard in a first field of the touch screen display for a character selection for the text input,
        sense for a manual selection of one or more selected characters of the A-Z keyboard and outputting the selected characters to the text input field of the third-party application; and
    said camera mode configured to:
        capture an image of a written text by the camera;
        display said captured image in a second field of the display;
        convert said captured image to recognized character text by optical character recognition (OCR);
        display the recognized character text as an overlaid text over the original text within the captured image, and
        sense for a manual selection of a part of the displayed recognized character text and outputting said selected part of the recognized character text to the text input field of the third-party application;
    wherein said capturing, displaying of said captured image, converting, and displaying of said recognized character text is capable of being accomplished by a single operation comprising a single keypress, a control command or a single gesture.

2. The method according to claim 1, wherein one or more suggestion candidates of said recognized character text are determined by an algorithm in connection with a data base and are displayed in one or more third fields or as another overlay within said second field, and said one or more suggestion candidates are selectable by a keypress event on a key, wherein said key is one or more of a group consisting of
    a visible key: and
    a hidden key within one or more of a group consisting of
        one or more of the fields of said display,
        on the recognized character text, and
        on another text on said display.

3. The method according to claim 2, wherein said keypress event providing said selection is from the group consisting of a single touch keypress and a single swipe gesture on a touch screen.

4. The method according to claim 1, wherein a size of the first field and/or the second field is the same size of the original keyboard module on said mobile device.

5. The method according to claim 1, wherein said second field is displayed adjacent to said A-Z keyboard in said first field.

6. The method according to claim 1, wherein the steps of capturing, displaying said captured image, converting, and displaying said recognized character text are executed repetitively until a certain keypress is detected to end said repetitive execution,
    wherein the respective latest recognized text in the part of the respective latest captured image is analyzed for new text in regards to a previously recognized character text that is output to said application requesting said input text, whereupon a control command is generated for the selection of the new text as the recognized character text, and said new text is output to said application requesting said input text.

7. The method according to claim 6, wherein said control command for the selection of said recognized character text is generated automatically via a detection algorithm, wherein said detection algorithm recognizes whether said recognized character text in a previously captured image and in the current captured image are the same.

8. The method according to claim 1, wherein:
    said keyboard mode for character selection is executed by a keyboard text input module;

said camera mode is executed by a camera text input module, wherein the execution of said keyboard text input module is independent from the execution of said camera text input module, but wherein the execution of said camera text input module is dependent on the execution of said keyboard text input module;

wherein said camera text input module is always active in the background to detect whether said keyboard text input module is active, wherein detection of execution of said keyboard text input module activates said camera mode, wherein at least the second field and the recognized character text are visible on the display; and wherein said camera mode is deactivated if said camera text input module detects that said keyboard text input module ceases to be active.

9. A mobile device configured to facilitate multimodal text input for a third-party application, the mobile device comprising:

a display being a touch screen display configured to display text and image content in a frame;

an A-Z keyboard being a touch screen A-Z keyboard on the touch screen display having a keyboard mode, wherein said touch screen A-Z keyboard is configured to receive input text;

a camera having a camera mode; and a processor in communication with said touch screen display, said touch screen A-Z keyboard, and said camera, said processor being configured to:

execute the third-party application using an original communication interface to an original keyboard module, wherein a multimodal text input module replaces the original keyboard module communicating with said third-party application instead of the original keyboard module, said third-party application requesting an input text through a text input field;

execute the multimodal text input module by running the multimodal text input module in the background of the mobile device and constantly monitoring the background of the mobile device to detect when the text input field of the third-party application is activated, the multimodal text input module simultaneously activates both a keyboard mode and a camera mode;

wherein said keyboard mode is configured to:

display the A-Z keyboard in a first field of the touch screen display for a character selection for text input, and sense for a manual selection of one or more characters on the A-Z keyboard and output the selected characters to the text input field of the third-party application; and wherein said camera mode is configured to:

capture an image of a written text by the camera;

display said captured image in a second field of the display;

convert said captured image to recognized character text by optical character recognition (OCR);

display the recognized character text as an overlaid text over the original text within the captured image;

sense for a manual selection of a part of the displayed recognized character text; and output said selected part of the recognized character text to the text input field of the third-party application requesting the input text;

wherein said capturing, displaying of said captured image, converting, and displaying of said recognized character text is accomplished by a single operation comprising a single keypress, a control command, or a single gesture.

10. The mobile device according to claim 9, wherein said keyboard mode and said camera mode are both active simultaneously.

11. The mobile device according to claim 10, wherein said processor configures said A-Z keyboard and said camera such that they are active at the same time.

12. The mobile device according to claim 10, wherein said single operation such as said keypress, said control command, and said single gesture include the selection of said recognized character text as input text; the selection of said character key from the A-Z keyboard as input text; and the immediate output of said input text to said processor.

13. The mobile device according to claim 9, wherein said A-Z keyboard comprises two sub-modules, wherein a first standard keyboard sub-module is activated by the processor in response to a request for input text by said application; and said second camera sub-module configured to be always active in the background detecting whether said first keyboard sub-module is activated.

14. The mobile device according to claim 13, wherein said processor is configured to activate said camera mode in response to the activation of said second camera sub-module, such that said second field is displayed adjacent to the A-Z keyboard; and shut down said camera mode when said second keyboard sub-module is no longer activated by said application.

* * * * *